(12) United States Patent
Hegener et al.

(10) Patent No.: US 8,082,643 B2
(45) Date of Patent: Dec. 27, 2011

(54) MACHINING APPARATUS

(75) Inventors: Guido Hegener, Remseck (DE); Roland Schmitz, Vaihingen (DE)

(73) Assignee: Emag Holding GmbH, Salach (DE)

( * ) Notice: Subject to any disclaimer, the term of this patent is extended or adjusted under 35 U.S.C. 154(b) by 902 days.

(21) Appl. No.: 12/009,763

(22) Filed: Jan. 22, 2008

(65) Prior Publication Data

US 2009/0155012 A1    Jun. 18, 2009

(30) Foreign Application Priority Data

Feb. 1, 2007 (DE) .......................... 10 2007 005 846

(51) Int. Cl.
| | |
|---|---|
| B23P 23/00 | (2006.01) |
| B24B 5/04 | (2006.01) |
| B23B 7/08 | (2006.01) |
| B23B 7/16 | (2006.01) |
| B23B 3/20 | (2006.01) |
| B23Q 7/00 | (2006.01) |

(52) U.S. Cl. ............... 29/28; 29/27 C; 29/563; 409/134; 409/165; 451/244; 451/242; 451/246; 451/451; 82/122; 82/124; 82/129

(58) Field of Classification Search ................... 29/27 C, 29/27 R, 28, 563, 36, 38 A, 33 P; 82/122, 82/120, 121, 124, 129; 409/165, 167, 158, 409/159, 161, 172, 173, 134; 451/242, 244, 451/246, 178, 464, 482, 451, 435, 402, 397–398, 451/385

See application file for complete search history.

(56) References Cited

U.S. PATENT DOCUMENTS

| | | | | |
|---|---|---|---|---|
| 4,159,660 A | * | 7/1979 | Buckley et al. ................. | 82/129 |
| 5,940,948 A | * | 8/1999 | Rehm .............................. | 29/563 |
| 5,997,452 A | * | 12/1999 | Assie .............................. | 82/129 |
| 6,233,810 B1 | * | 5/2001 | Asbeck ........................... | 29/563 |
| 6,394,892 B2 | * | 5/2002 | Hanisch et al. ............... | 451/240 |
| 2002/0014139 A1 | | 2/2002 | Hirose et al. | |
| 2006/0270540 A1 | * | 11/2006 | Takayama et al. ............ | 409/134 |

FOREIGN PATENT DOCUMENTS

| | | |
|---|---|---|
| DE | 4441106 | 5/1996 |
| DE | 102004012385 | 9/2005 |
| DE | 102004038005 | 1/2006 |
| EP | 1175963 | 1/2002 |
| JP | 05154701 | 6/1993 |
| WO | WO 8700464 | 1/1987 |
| WO | WO9961203 | 12/1999 |
| WO | WO 2006063540 | 6/2006 |

OTHER PUBLICATIONS

Machine Translation DE 102004012385, which DE' 385 was published Sep. 2005.*
Machine Translation DE 102004038005, which DE '005 was published Jan. 2006.*

* cited by examiner

*Primary Examiner* — Erica E Cadugan
(74) *Attorney, Agent, or Firm* — Andrew Wilford

(57) ABSTRACT

A machining apparatus has a vertical support frame defining two machining stations spaced apart in a direction, holders in the stations for rotating respective workpieces each about a respective station axis, and a transfer device for loading rough workpieces into the holders and for taking finished workpieces out of the holders. A single machining tool can be shifted in the direction between one position engaging the workpiece in one of the stations and out of engagement with the workpiece in the other of the stations and another position engaging the workpiece in the other station and out of engagement with the workpiece in the one station.

9 Claims, 3 Drawing Sheets

MACHINING APPARATUS

OBJECTS OF THE INVENTION

It is therefore an object of the present invention to provide an improved machining apparatus.

Another object is the provision of such an improved machining apparatus that overcomes the above-given disadvantages, in particular that operates more efficiently, in particular by using the machining tools virtually continuously.

SUMMARY OF THE INVENTION

A machining apparatus has according to the invention a vertical support frame defining two machining stations spaced apart in a direction, holders in the stations for rotating respective workpieces each about a respective station axis, and a transfer device for loading rough workpieces into the holders and for taking finished workpieces out of the holders. A single machining tool according to the invention can be shifted in the direction between one position engaging the workpiece in one of the stations and out of engagement with the workpiece in the other of the stations and another position engaging the workpiece in the other station and out of engagement with the workpiece in the one station.

With a machining apparatus according to the invention, one machining tool can work with at least two workpiece holders. While the workpiece on the first holder is being processed, the already processed workpiece on the second holder can be exchanged for an unprocessed or rough workpiece. Since the machining tool must only traverse a very short path between the workpiece holders, this results in an extremely short time during which the machine is not actually working. With this system the workpiece holders are fitted with shaft-like or elongated workpieces. However, a one-ended chuck or headstock can be used. The machine frame is manufactured in a block-type construction, for example from a polymer resin concrete. However it can also be made as a cast or welded structure. Additional machining tools are provided for with an advantageous embodiment, so that four-axis processing can be done at each of the workpiece holders, as needed.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
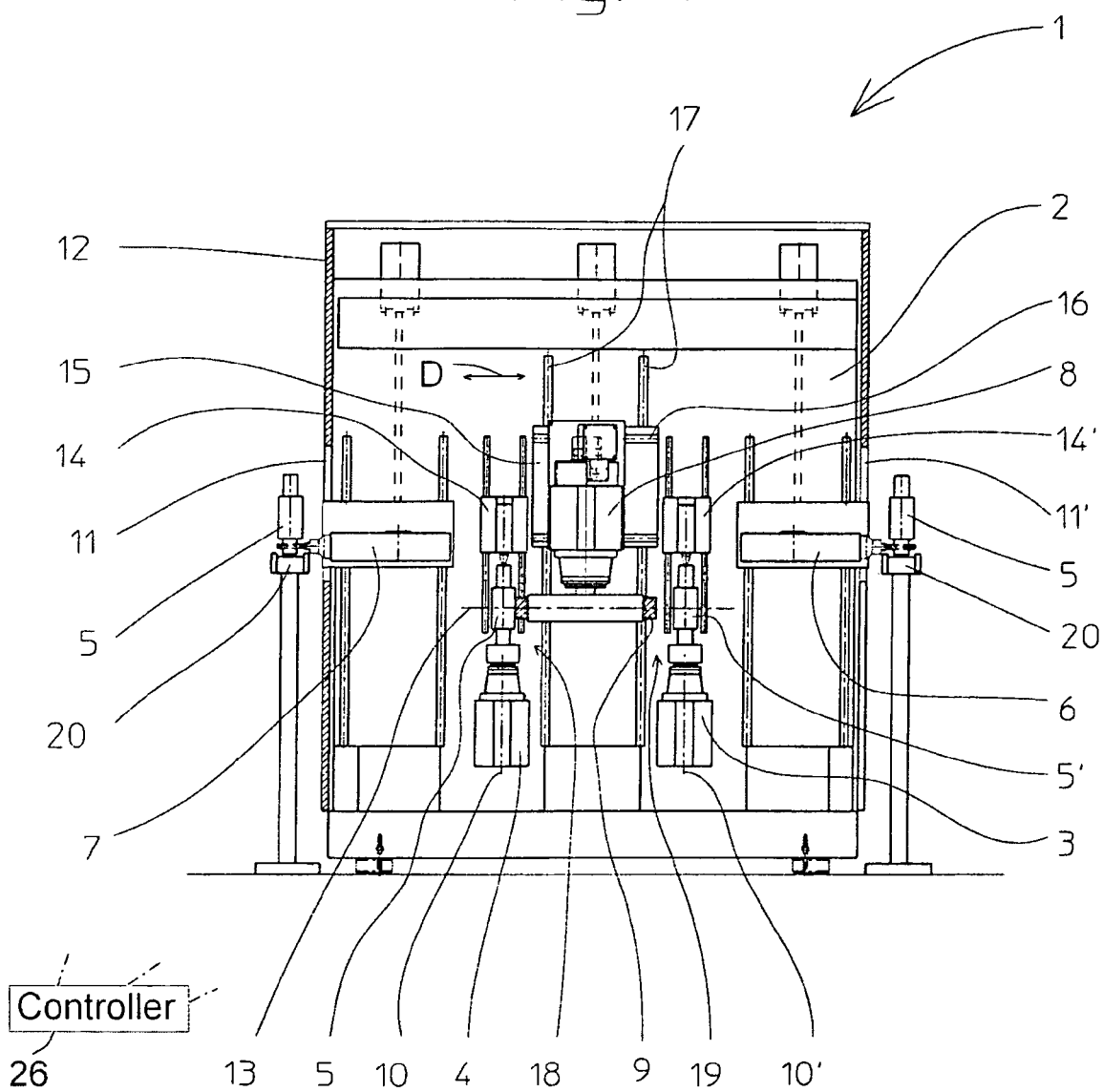
FIG. 1 is a partly schematic side view of a machining apparatus according to the invention.

As seen in FIG. 1 shows a machining apparatus 1 with two vertical workpiece holders arranged next to each other for processing of rotationally symmetrical elongated rough workpieces into finished workpieces 5'. The apparatus 1 comprises a rigid-form machine frame with a vertical side wall 2. Respective chucks or headstocks 3 and 4 that which are spaced from one another in a horizontal direction D. Respective tailstocks 14 and 14' are aligned with along respective axes 10 and 10' with the headstocks 3 and 4. The headstocks 3 and 4 are normally stationary, but the tailstocks 14 and 14' can move vertically on respective rails or guides carried on the support wall 2.

A machining unit 8 carrying tool 9, here a grinding disk centered on and rotatably driven about a vertical axis midway between the axes 10 and 10' is provided between the machining stations 18 and 19 defined by the workpiece holders 3, 14 and 4, 14'. This unit 8 is horizontally shiftable on guides 16 on a slide or carriage 15 in turn vertically shiftable on guides or rails 17 on the side wall 2. Thus the tool 9 can be moved horizontally between the two machining stations and vertically along the stations 18 and 19. Thus workpieces 5 can be processed by lengthwise, milling, grinding or oscillating grinding action.

The tool 9 is only moved in the direction D through a very short distance between its position working on the workpiece 5 in the one station 18 and its position working on the workpiece 5 in the other station 19, or vice versa. Thus time wasted during switchover from machining one workpiece and machining another workpiece is very short. A controller 26 is connected to unillustrated actuators to effect this movement.

The rough workpieces 5 are supplied to the machining apparatus 1 on conveyer belts 20. Thence they are gripped by workpiece transport devices 6 and 7 and moved through openings or ports 11 in end walls 12 and inserted into the workpiece holders 3 and 4. The controller 26 is also connected to these transport devices 6 and 7 so that as one workpiece 5 is being processed in the first work position 18, the already processed workpiece 5' in the second work position 19 can be exchanged for an unprocessed workpiece 5. In an advantageous embodiment, the openings 11 in the end walls 12 are situated above a plane 13 at which actual machining takes place inside the machine 1. Thus escape of coolant or shavings thrown off by the spinning tool 9 and workpiece 5 through the ports 11 is prevented.

Figure 2:
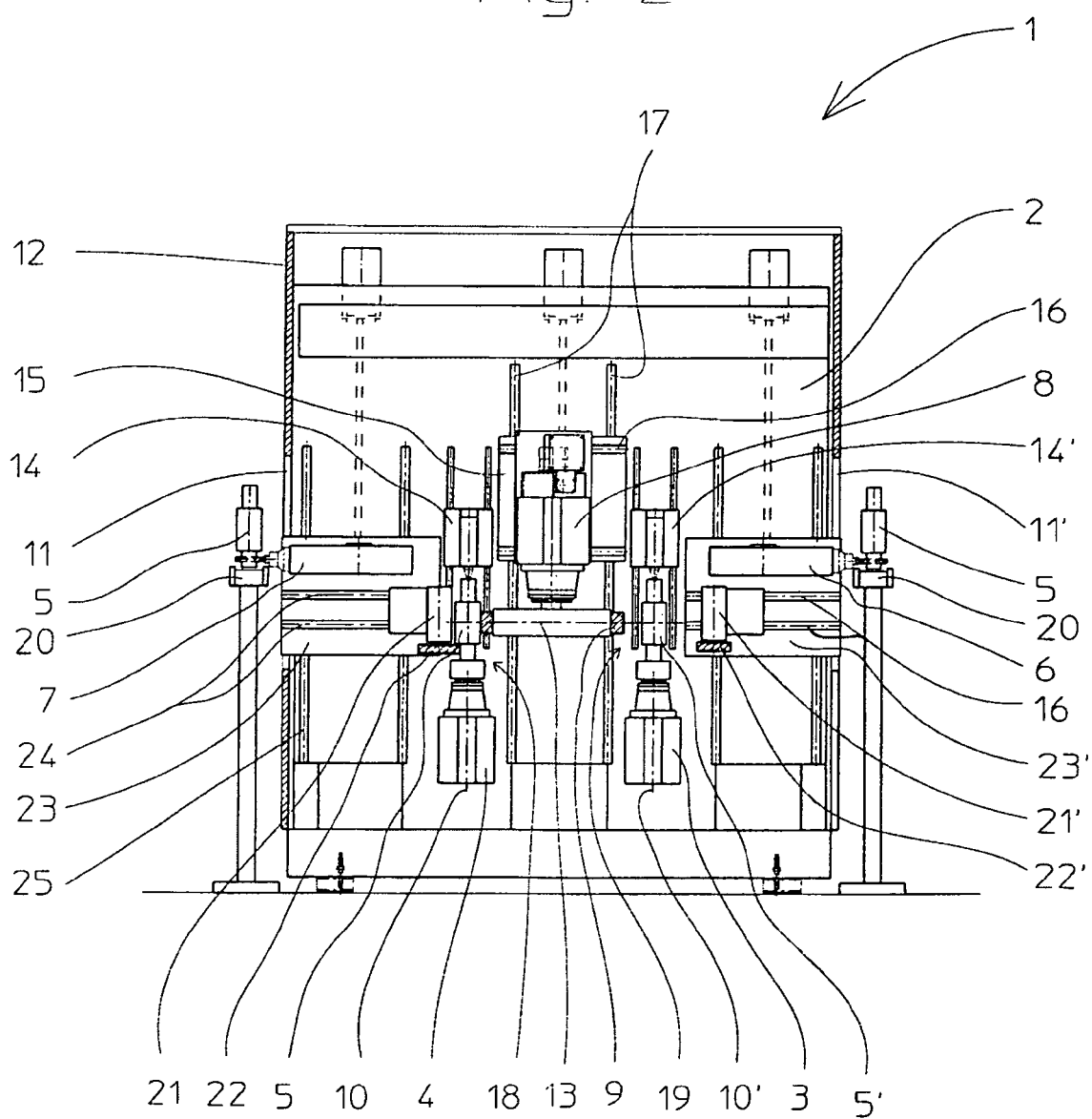
FIGS. 2 and 3 are views like FIG. 1 of further machining apparatuses in accordance with the invention.

FIG. 2 shows a machining apparatus 1 according to FIG. 1 with additional machining tools 21 and 21' that can move along horizontal guide rails 24 on respective slide frames 23. In turn the frames 23 can move along the vertical wall 2 on vertical guide rails 25. Thus, if necessary, four-axis machining is possible at each of the workpiece holders 3, 4. For example, the tool 9 can be a roughing tool and tools 22 smoothing or finish tools.

Figure 3:
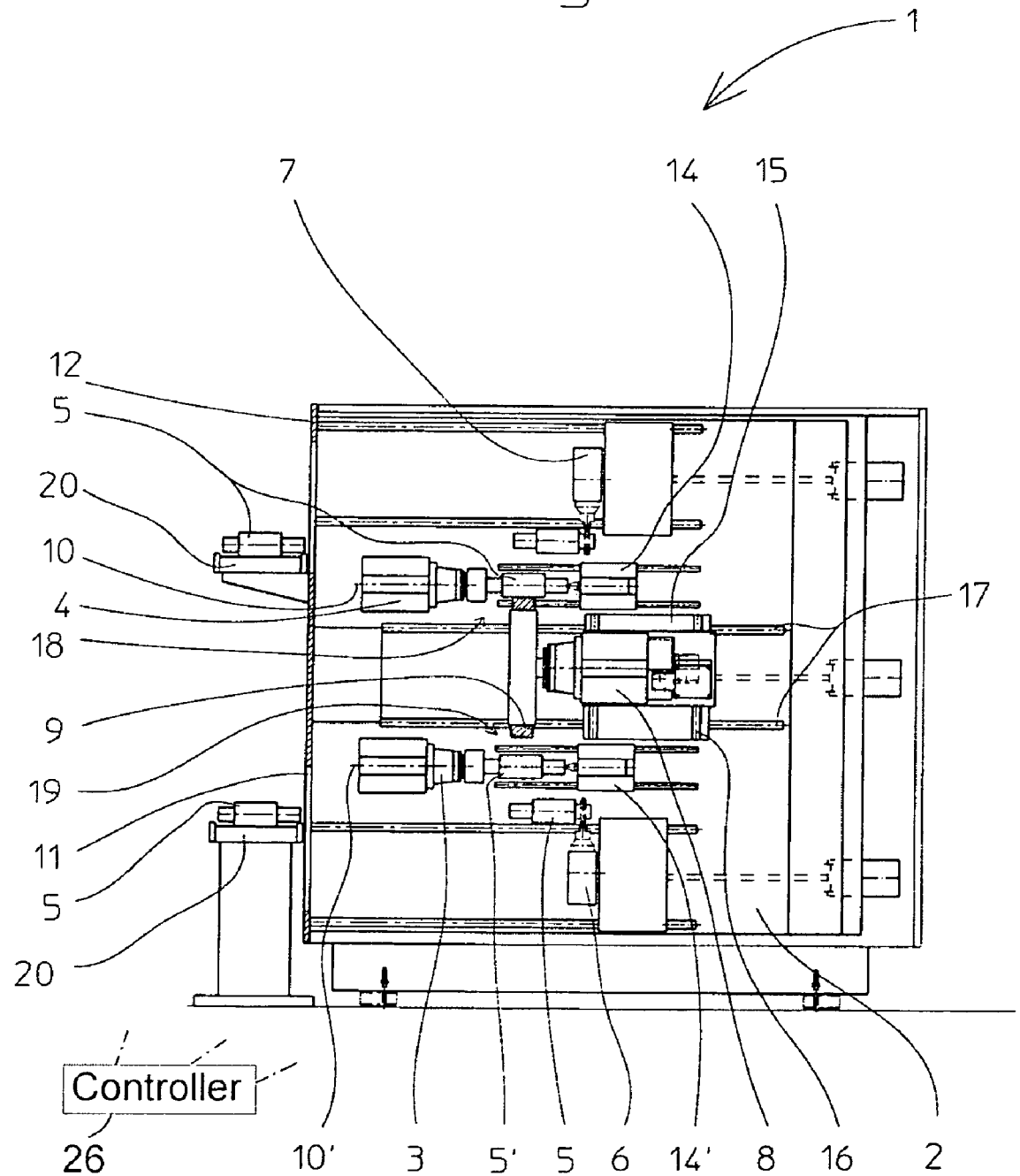

In FIG. 3, machining apparatus 1 is shown with horizontal holders, that is the direction D is vertical and axes 10 and 10' are horizontal. Otherwise this arrangement generally corresponds to that of FIG. 1. Here, however, the workpieces 5 are fed in at one end of the machine by the conveyor belts 20 and also extracted there. The machining assembly 8 moves in the vertical direction along guide-rails 16 on the frame 15.

We claim:

1. A machining apparatus comprising:
   a pair of vertical end walls spaced apart in a direction, defining and flanking two machining stations spaced apart in the direction, and each formed with a respective port;
   respective means in each of the stations for holding a respective workpiece and rotating it about a respective vertical station axis;
   transfer means for loading rough workpieces through one of the ports into the holding means of one of the stations and for taking finished workpieces out of the holding means of the other of the stations and through the other of the ports;
   a machining tool; and
   means for shifting the machining tool in the direction in a plane below the ports between one position engaging the workpiece in one of the stations and out of engagement with the workpiece in the other of the stations and another position engaging the workpiece in the other station and out of engagement with the workpiece in the one station.

2. The machining apparatus defined in claim 1 wherein the station axes are generally perpendicular to the direction.

3. The machining apparatus defined in claim 1, further comprising
   means for displacing the machining tool generally parallel to the station axes.

4. The machining apparatus defined in claim 1, further comprising
   means for rotating the machining tool about a tool axis generally parallel to the station axes.

5. The machining apparatus defined in claim 1, further comprising control means connected to the transfer means, holding means, and shifting means for unloading a workpiece from the one station and loading another workpiece into the one station while the machining tool is engaging the workpiece in the other station and for unloading a workpiece from the other station and loading another workpiece into the other station while the machining tool is engaging the workpiece in the one station.

6. The machining apparatus defined in claim 1, further comprising
   respective second machining tools separate from the first-mentioned machining tool and engageable with the workpieces in the stations; and
   means for shifting the second machining tools generally perpendicular to the station axes.

7. The machining apparatus defined in claim 6 wherein the first machining tool is a rough-machining tool and the second tools are finishing tools.

8. The machining apparatus defined in claim 6 wherein the tools are grinding tools.

9. The machining apparatus defined in claim 1 wherein the holding means in the stations each include a headstock and a tailstock centered on the respective station axis.

* * * * *